United States Patent [19]

Steigerwald

[11] 4,253,054
[45] Feb. 24, 1981

[54] PHASE CONTROLLED RECTIFIER CIRCUIT FOR RAPIDLY CHARGING BATTERIES

[75] Inventor: Robert L. Steigerwald, Scotia, N.Y.

[73] Assignee: General Electric Company, Schenectady, N.Y.

[21] Appl. No.: 9,305

[22] Filed: Feb. 5, 1979

[51] Int. Cl.³ .............................................. H02J 7/10
[52] U.S. Cl. ...................................... 320/14; 320/21; 320/59; 363/128
[58] Field of Search ....................... 320/14, 21, 57, 59; 363/128

[56] References Cited

U.S. PATENT DOCUMENTS

| | | | |
|---|---|---|---|
| 3,609,502 | 9/1971 | Burkett et al. | 320/57 X |
| 3,732,481 | 5/1973 | Mas | 320/14 |
| 3,950,689 | 4/1976 | Jamison | 320/57 X |
| 4,024,453 | 5/1977 | Corry | 363/28 |
| 4,136,382 | 1/1979 | Ricci | 320/57 X |

Primary Examiner—Robert J. Hickey
Attorney, Agent, or Firm—William H. Steinberg; James C. Davis, Jr.; Paul R. Webb, II

[57] ABSTRACT

An improved battery charger circuit for rapidly charing a battery by increasing the rate of battery charge acceptance through periodic battery discharge during the charging process includes a pair of first and second controlled rectifier circuits coupled to an AC source and adapted for coupling to a battery. The first controlled rectifier circuit is rendered conductive during the charging intervals to supply the battery with charge current from the AC source. The second controlled rectifier circuit is rendered conductive during battery discharge intervals to discharge the battery in a substantially lossless manner by conducting battery discharge current through the AC source, thus realizing a highly efficient battery charger.

9 Claims, 11 Drawing Figures

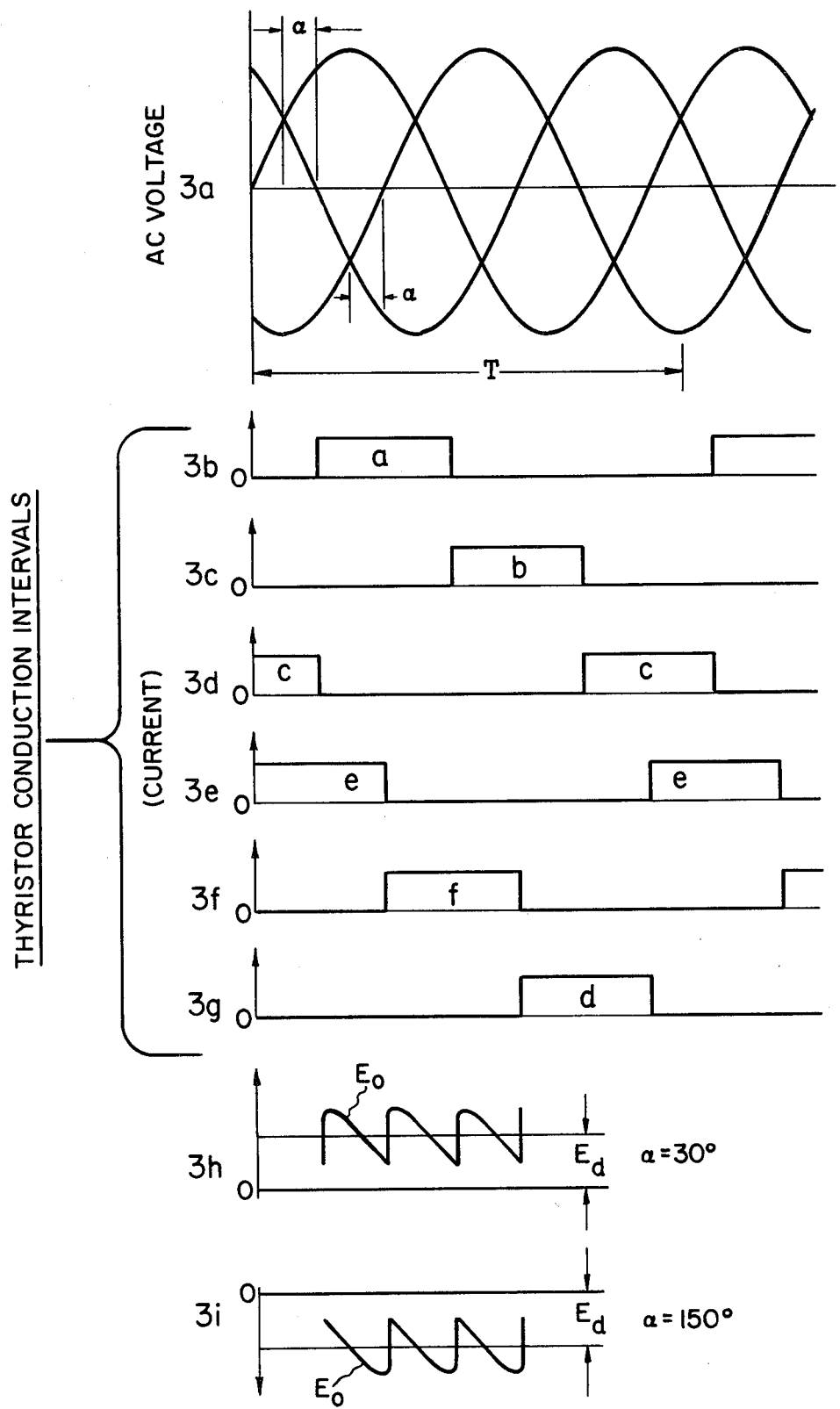

PHASE CONTROLLED RECTIFIER CIRCUIT FOR RAPIDLY CHARGING BATTERIES

BACKGROUND OF THE INVENTION

This invention relates to a battery charger for rapidly charging batteries by increasing the rate of battery charge acceptance through periodic discharge of the battery in a substantially lossless manner during the charging process.

Future widespread use of electric vehicles is dependent, in large part, upon how rapidly vehicle batteries can be recharged. Rapid charging of vehicle batteries is more efficient, and allows more batteries to be charged from a single charge during a given time.

A technique recently described for increasing the rate of battery charge acceptance requires that the battery under charge be periodically discharged at a high rate for short intervals during the charging process. Periodic battery discharge during the charging process results in drastic reduction of the time required to recharge the battery in comparison with conventional battery charging methods.

One such battery charger circuit for rapidly charging a battery by periodically discharging the battery during the charging process has been disclosed by Joseph Mas in U.S. Pat. No. 3,816,806 issued June 11, 1974. In the Mas circuit, a current source for supplying battery charge current is coupled in parallel with the series combination of the collector-emitter portion of a transistor and a resistor. During charging intervals, the transistor remains nonconductive, and the battery receives undiverted charge current. Battery discharge is accomplished by rendering the transistor conductive, diverting charge current away from the battery and causing high current discharge pulses, supplied by the sum of charge current and battery discharge current, to be dissipated in the resistor. When the transistor is rendered substantially nonconductive, the charging process resumes.

A disadvantage incurred by the Mas circuit is that discharge current pulses are dissipated in a resistor. As the frequency of battery discharging increases, substantial power losses occur, resulting in inefficient battery charger operation.

In my presently copending application Ser. No. 958,698, now U.S. Pat. No. 4,211,969, entitled "High Efficiency Battery Charger for Rapidly Charging Batteries", I describe and claim a battery charger for rapidly and efficiently charging a battery by periodically discharging the battery in a substantially lossless manner for short intervals at a high rate during the charging process. The battery charger comprises a pair of chopper circuits, each coupled across the parallel combination of a DC source and a capacitor. The chopper circuits are adapted for coupling to a battery under charge. Battery charge current is conducted to the battery from the parallel combination of the DC source and capacitor during intervals when the first chopper circuit is conductve. Battery discharge is accomplished by commutating the first chopper circuit and subsequently rendering the second chopper circuit conductive to provide a low loss discharge path for conducting battery discharge current through the capacitor to store battery discharge energy for later return during the charging process. Unlike the Mas circuit, the circuit described in my aforementoned application Ser. No. dissipates little battery discharge power.

The present circuit concerns a high efficiency battery charger circuit for rapidly charging batteries in a substantially lossless manner by conducting battery discharge current through the AC source from which it is being charged. By conducting battery discharge current through the AC source, the battery charger circuit of the present invention eliminates the discharge of dissipating discharge pulse power in a resistor.

BRIEF SUMMARY OF THE INVENTION

Briefly, in accordance with the preferred embodiment of the invention, a phase controlled rectifier circuit for rapidly charging a battery by increasing the rate of battery charge acceptance through periodic discharge of the battery in a substantially lossless manner during the charging process comprises a pair of first and second controlled rectifier networks coupled to an AC source and adapted for coupling to a battery under charge. The first controlled rectifier circuit, configured of a phase-controlled thyristor bridge, is rendered conductive during charging intervals to conduct charge current from the AC source to the battery. The second controlled rectifier network, typically configured of either a phase controlled thyristor bridge or a full wave bridge network, when rendered conductive, discharges the battery in a substantially lossless manner by conducting battery discharge current through the AC source, thus realizing an efficient battery charger.

It is an object of the present invention to provide a battery charger circuit for rapidly charging a battery by periodically discharging the battery in a substantially lossless manner at a high rate for short intervals during the charging process.

It is another object of the present invention to provide a battery charger for rapidly charging batteries through periodic battery discharge which is accomplished in a substantially lossless manner by conducting battery discharge current through the AC source from which it is being charged.

BRIEF DESCRIPTION OF THE DRAWINGS

The features of the invention believed to be novel are set forth with particularity in the appended claims. The invention itself, however, both as to organization and method of operation, together with further objects and advantages thereof may best be understood by reference to the following description taken in conjunction with the accompanying drawings in which:

FIG. 3a is a graphical representation of the line to neutral voltage waveforms of the AC source comprising a portion of the battery chargers illustrated in FIS. 1 and 2;

FIGS. 3b–3g, respectively, are graphical representations of the conduction intervals of certain thyristors which comprise a portion of the battery chargers of FIGS. 1 and 2; and FIGS. 3h and 3i are graphical representations of the output voltage waveforms of a controlled rectifier circuit comprising a portion of the battery charges of FIGS. 1 and 2, for two separate values of thyristor phase delay angle $\alpha$.

DETAILED DESCRIPTION OF THE PREFERRED EMBODIMENT

Figure 1:
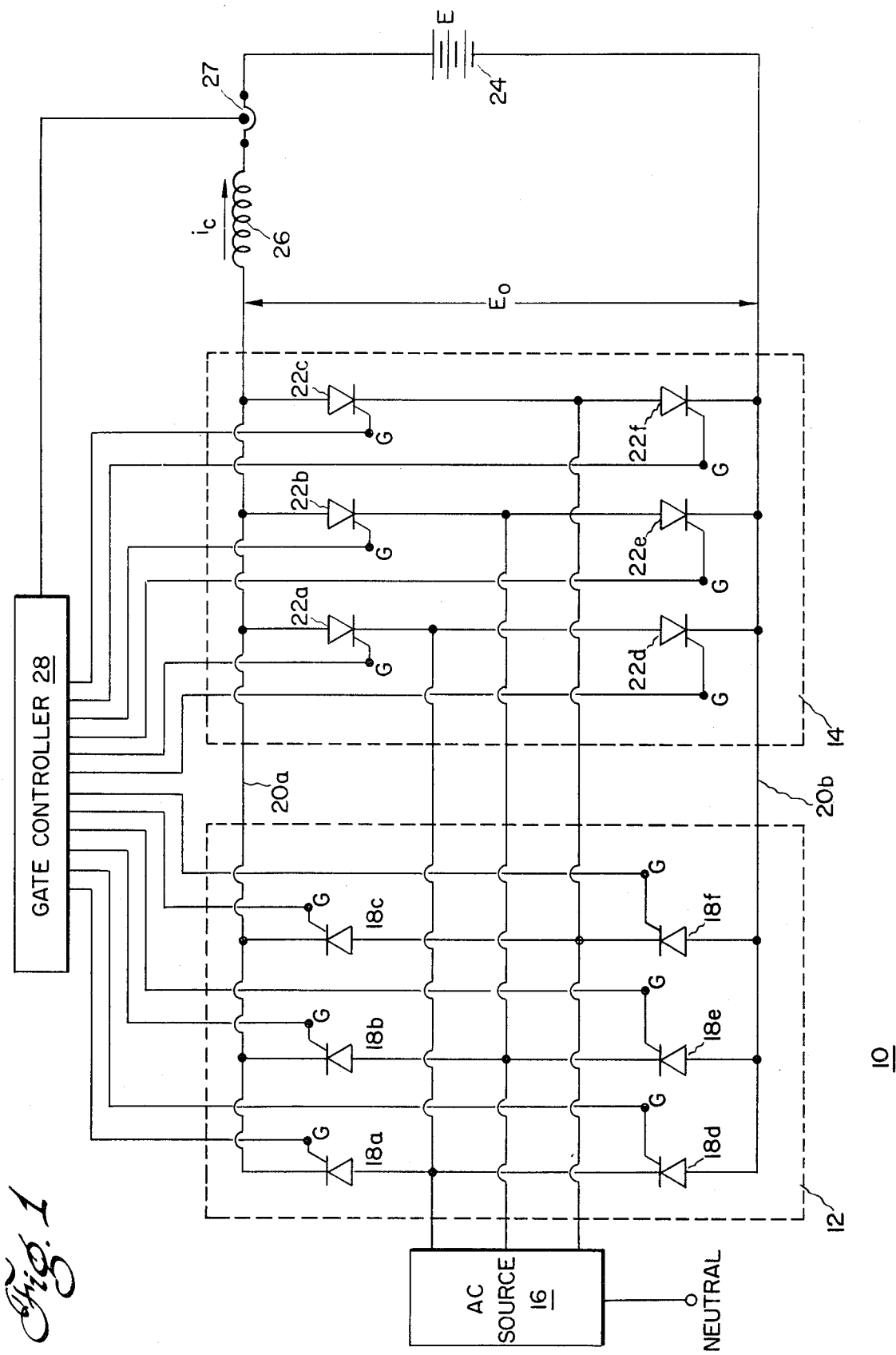
FIG. 1 is a schematic diagram of a preferred embodiment of the battery charger of the present invention.

In FIG. 1, a preferred embodiment 10 of a phase controlled rectifier battery charger for rapidly charging batteries comprises first and second controlled rectifier circuits 12 and 14, respectively, each coupled to an AC source 16 for alternately conducting battery charge current from the AC source and conducting battery discharge current through the AC source during battery charging and discharging intervals, respectively.

With AC source 16 configured of a three phase source, first rectifier circuit 12 comprises a three phase bridge-controlled rectifier network which is configured of three pairs of thyristors, such as thyristors 18a and 18d, 18b and 18e, and 18c and 18f, the thyristors of each thyristor pair coupled in series aiding fashion. Each pair of thyristors is coupled across busses 20a and 20b, with the anode electrode of thyristors 18d, 18e and 18f coupled to bus 20b and the cathode electrode of thyristors 18a, 18b and 18c coupled to bus 20a. The junction between thyristors of each thyristor pair is coupled to a respective phase of AC source 16.

Second rectifier circuit 14 is also configured of a three phase bridge-controlled rectifier network and comprises three pairs of thyristors such as thyristors 22a and 2d, 22b and 22e, and 22c and 22f, respectively, the thyristors of each thyristor pair coupled in series aiding fashion. Each thyristor pair is coupled across bus 20a and 20b with the anode electrode of thyristors 22a, 22b and 22c coupled to bus 20a and the cathode electrode of thyristors 22d, 22e and 22f coupled to bus 20b. Each one of the three phases of AC source 16 is coupled to the junction between thyristors 22a and 22d, 22b and 22e and 22c and 22f, respectively. A battery 24 to be charged is coupled at its positive terminal to bus 20a by a filter 26 shown as an inductor in series with a current sensor 27 comprised of a current transformer or the like. The negative terminal of battery 24 is coupled to bus 20b.

As will be better understood with respect to the operation of battery charger 10, thyristors 18a through 18f and thyristors 22a through 22f, are rendered conductive in a predetermined sequence in response to gating signals supplied to the gate electrode G of each thyristor from a gate controller 28, the frequency of thyristor gating signals being determined in accordance with the magnitude of current, $i_c$ through inductor 26 as sensed by current sensor 27. Various thyristor gating circuits exit and selection of such a thyristor gating circuit will necessarily depend upon design parameters. Therefore, the details of gate controller 28 are not shown. For a further, more detailed discussion of thyristor firing circuits, reference should be had to Chapter IV of the *General Electric Silicon Controlled Rectifier Handbook* published by Semiconductor Products Department of General Electric Company, Syracuse, N.Y. 1972.

Operation of battery charger 10 will be explained by reference to FIGS. 1 and 3a through 3h. To commence charging of battery 24, rectified AC current is supplied from AC source 16 to battery 24 by rectifier circuit 12 as follows. Between the consecutive zero crossings of the line to neutral voltages of AC source 16, the waveforms of which voltages are illustrated in FIG. 3a, thyristors 18a, 18b and 18c and thyristors 18e, 18f and 18d of battery charger 10 of FIG. 1 are rendered conductive by gate controller 28 in the sequence and for the duration indicated by the intervals a, b, c, e, f and d illustrated in FIGS. 3b through 3g, respectively, to conduct current from AC source 16 to battery 24. From examination of FIG. 1 and FIGS. 3b through 3g, respectively, it may be observed that during the time when battery 24 is supplied with positive charge current, only one of thyristors 18a–18c and one of thyristors 18e–18f in separate series-aiding thyristor pairs are conductive during any one interval. Each thyristor is commutated by the corresponding line to neutral AC voltage of source 16 at an appropriate interval after conduction.

The mean amplitude of the output voltage of rectifier network 12, denoted $E_O$, varies in accordance with the phase delay, represented by the angle $\alpha$, between the zero crossings of the line neutral voltages of AC source 16 and the initiation of thyristor conduction. This may be better understood by reference to FIGS. 3h and 3i which illustrate the waveform of the output voltage $E_O$ for the condition where $\alpha = 30°$ and $150°$, respectively. During the time when positive charge current is supplied to battery 24, gate controller 28 continuously varies the phase delay $\alpha$ by controlling the phase delay of thyristor conduction so that the mean value of $E_O$ during battery charging is always maintained slightly larger than the voltage $E_d$ of battery 24 to compensate for resistive losses of inductor 26 and battery 24.

Battery discharge is commenced by first "phasing back" thyristors 18a through 18f of rectifier circuit 12. In other words, the initiation of thyristor conduction is delayed such that $\alpha$ now exceeds 90°, resulting in the average value of $E_O$ decreasing below zero. Thyristors 22a, 22b, 22c and thyristors 22e, 22f and 22d, respectively, are thereafter gated into conduction by gate controller 28 in the sequence and for the duration now indicated by intervals a, b, c, e, f and d illustrated in FIGS. 3b through 3g, respectively, to discharge battery 24 by conducting battery discharge current through AC source 16. Each of thyristors 22a through 22f, respectively, is commutated by the line to neutral voltages of AC source 16 at predetermined intervals after conduction. As will be understood by those skilled in the art, rectifier circuit 14 operates, during intervals of battery discharge, as a line-commutated inverter.

Battery charging is resumed by allowing thyristors 22a through 22f of rectifier circuit 14 to remain nonconductive after each thyristor has been commutated by AC voltage, and rendering thyristors 18a, 18b and 18c and thyristors 18e, 18f and 18d sequentially conductive, as described previously, to conduct AC current from source 16 to battery 24.

Figure 2:
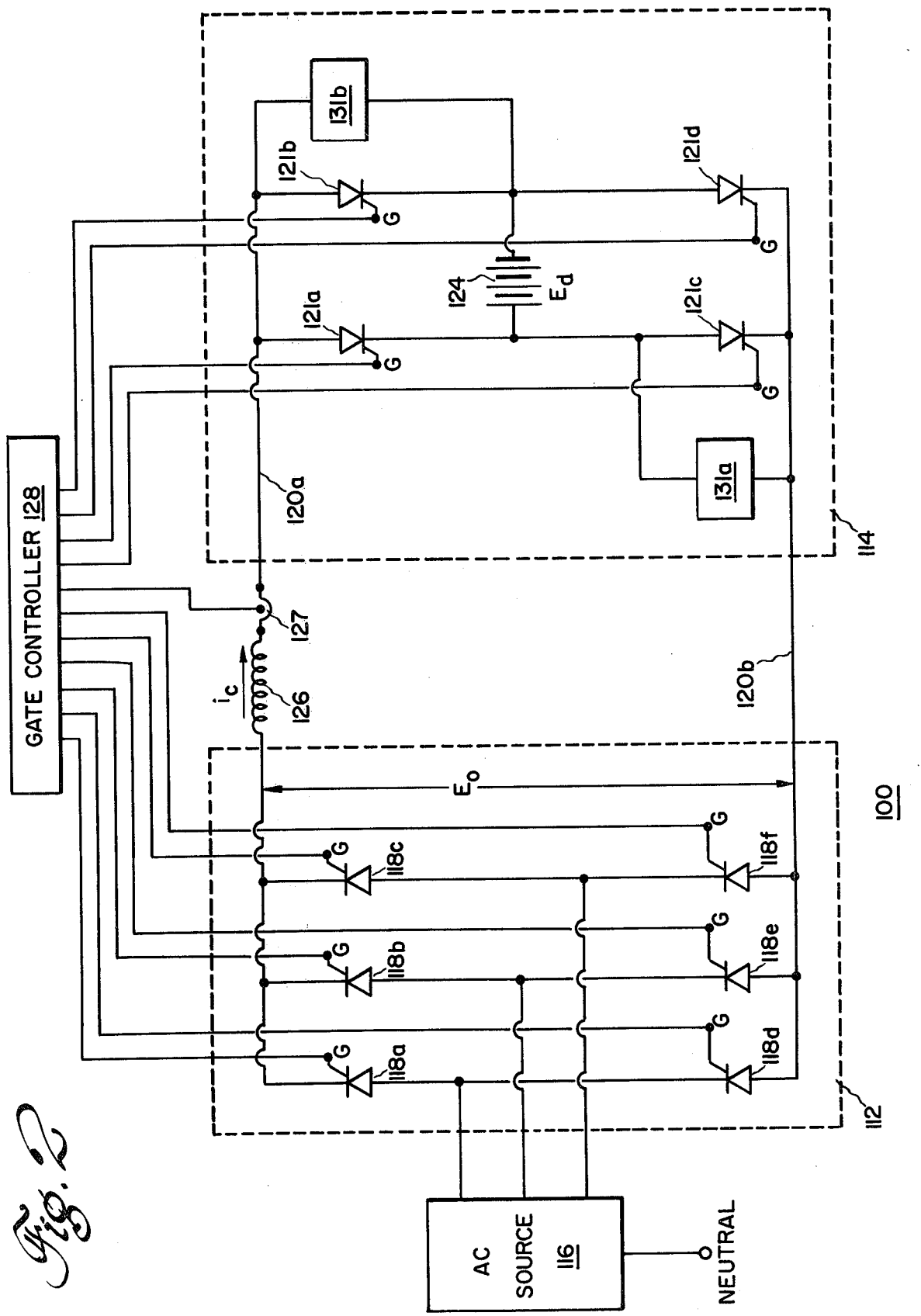
FIG. 2 is a schematic diagram of another preferred embodiment of the battery charger of the present invention.

Referring now to FIG. 2, an alternate embodiment 100 of a phase controlled rectifier circuit for rapidly charging batteries comprises first and second controlled rectifier circuits 112 and 114 coupled to an AC source 116 for supplying battery charge current to a battery from the AC source during charging intervals and for discharging the battery by conducting battery charge current through the AC source during discharge intervals.

In FIG. 2, with a three phase AC source 116, controlled rectifier circuit 112 is configured of a three phase bridge-controlled rectifier network and comprises three pairs of thyristors 118a and 118d, 118b and 118e, and 118c and 118f, the thyristors of each thyristor pair coupled in series aiding fashion. Each thyristor pair is coupled across busses 120a and 120b with the anode electrode of thyristors 118d, 118e and 118f coupled to bus 120b and the cathode electrode of thyristors 118a, 118b and 118c coupled to bus 120a. The junction between thyristors of each thyristor pair is coupled to a corresponding phase of AC source 116.

Second controlled rectifier circuit 114 is configured of a full wave bridge rectifier network and is comprised of two pairs of thyristors such as thyristors 121a and 121c and 121b and 121d, the thyristors of each thyristor pair coupled in series aiding fashion with the cathode of each of thyristors 121c and 121d coupled to bus 120b. The junction between thyristors 121a and 121c is coupled to the positive terminal of a battery 124 under charge, and the junction between thyristors 121b and 121d is coupled to the negative terminal of battery 124. An inductor 126 and a current sensor 127 connected in series couple the anode electrode of each of thyristors 121a and 121b to bus 120a, inductor 126 filtering current through battery 124.

As will be understood with respect to the operation of battery charger 100, each of thyristors 118a through 118f and 121a and 121d of controlled rectifier circuits 112 and 114, respectively, is gated into conduction in a predetermined sequence by gating signals supplied by gate controller 128 to the gate electrode G of each thyristor. The frequency of thyristor conduction is determined in accordance with the magnitude of current $i_c$ through inductor 126 as sensed by current sensor 127 which is typically configured of a current transformer or the like. For a further more detailed discussion of thyristor firing circuits such as employed in gate controller 128, reference should be had to Chapter IV of the previously referenced *General Electric Silicon Controlled Rectifier Handbook*.

Thyristor commutation circuits 131a and 131b are coupled across thyristors 121c and 121b, respectively, to commutate the thyristors during operation. Various thyristor commutation circuits exist, and selection of an appropriate thyristor commutation circuit will necessarily depend upon design parameters. Therefore, the details of thyristor commutation circuits 131a and 131b are not shown. For a further, more detailed desdription of thyristor commutation circuits, reference should be had to the paper "Thyristor Commutation in DC Choppers-A Comparative Study" by William McMurray published in the *IEEE Industry Applications Society Annual Conference Record* (1977). As will be explained in greater detail below, thyristors 118a through 118f of rectifier circuit 112 and thyristors 121a and 121b of rectifier circuits 114 respectively, are commutated during operation of battery charger 100 by AC voltage from source 116 and by battery voltage from battery 124, respectively.

Operation of battery charger 100 will be described by reference to FIGS. 1, and 3b-3g, respectively. To commence charging of battery 124, battery charge current is supplied from AC source 116 to battery 124 by rectifier circuits 112 and 114 as follows. Initially, thyristors 121a and 121d of rectifier circuit 114 are rendered conductive, effectively coupling battery 124 between current sensor 127 and bus 120b. Gate controller 128 then gates thyristors 118a, 118b, 118c and thyristors 118e, 118f and 118d into conduction in the sequence and for the duration indicated by intervals a, b, c and intervals e, f and d illustrated in FIGS. 3b through 3g, respectively, resulting in each thyristor conducting a portion of AC current to battery 124 during the AC voltage cycle. Gate controller 128 continuously varies α, the phase delay, by controlling the phase of thyristor conduction so that the mean value of the output voltage $E_O$ of rectifier circuit 112 is maintained slightly larger than the voltage magnitude $E_d$ of battery 124.

Battery discharge is accomplished by first increasing the phase delay interval α prior to initiating conduction of thyristors 118a-118c and 118e, 118f and 118d (i.e. thyristor "phase back") to reduce the mean value of the output voltage $E_O$ of rectifier circuit 112 below zero. Thereafter, gate controller 128 renders thyristors 121c and 121b, conductive. Bus 120b is now at a potential greater than bus 120a, causing battery 124 to discharge with battery discharge current first commutating thyristors 121a and 121d. Discharge of battery 124 continues with the conduction of battery discharge current through thyristors 121c and 121b, rectifier circuit 112 and AC source 116, rectifier circuit 112 now acting as a line commutated inverter.

To resume battery charging, commutating circuits 131a and 131b are rendered operative to commutate thyristors 121c and 121b, respectively. Thyristors 121a and 121d are first rendered conductive and then thyristors 118a and 118f, respectively, of rectifier circuit 112 are "phased forward" that is, the phase delay interval α prior to initiation of thyristor conduction is reduced, increasing the mean value of the output voltage $E_O$ of rectifier 112 above the magnitude of battery 124 voltage, thereby permitting battery 124 to be supplied with battery charge current.

In comparison to battery charge 10 of FIG. 1, battery charger 100 of FIG. 2 is "faster", that is it permits narrower battery discharge pulses. This results from the fact that when battery 124 is to be discharged, the current present in inductor 126 need only change by the amount equal to the difference between the charge current supplied by controlled rectifier circuit 112 and the discharge current of battery 124. In contrast, when battery charger 124 of FIG. 1 is to be discharged, current through inductor 26 of battery charger 10 must change by an amount equal to the sum of change current supplied to battery 24 and battery 24 discharge current.

The battery discharge pulse width as well as the magnitude of discharge pulses can be controlled in response to a sensed battery parameter, such as battery gassing rate, pressure, or terminal voltage. A typical range of discharge/charge intervals is given by aforementioned copending application Ser. No. 958,698, now U.S. Pat. No. 4,211,969.

The foregoing describes a battery charger circuit for rapidly charging batteries by increasing the rate of battery charge acceptance through periodic battery discharge in a substantially lossless manner, by conducting battery discharge current through the AC source.

While only certain preferred features of the invention have been shown by way of illustration, many modifications and changes will occur to those skilled in the art. For example, although the preferred embodiments of the invention have been described in conjunction with a three phase AC source, those skilled in the art will recognize that the battery charger may be readily modified to operate with single phase AC current. It is, therefore, to be understood that the appended claims are intended to cover all such modifications and changes as fall within the true spirit of the invention.

What is claimed is:

1. An efficient battery charger for rapidly charging batteries by increasing the rate of battery charge acceptance through periodic battery discharge in a subsantially lossless manner at a high rate for short intervals during the charging process comprising:

(a) an AC source;
(b) a first full bridge controlled rectifier circuit coupled to said AC source for providing charge current to a battery at predetermined intervals;
(c) a second full bridge controlled rectifier circuit coupled to said first full bridge controlled rectifier circuit and adapted for coupling to said battery, said second full bridge controlled rectifier circuit discharging said battery by conducting battery discharge current to said AC source during other than said predetermined intervals; and
(d) filter means coupled to said first and second full bridge controlled rectifier circuits for smoothing current through said battery.

2. The invention according to claim 1 wherein said AC source comprises a three phase AC source and wherein said first full bridge controlled rectifier circuit is configured of a three phase full bridge controlled rectifier network, said three phase full bridge controlled rectifier network comprising:

(a) three pairs of thyristors, the thyristors in each said thyristor pair being coupled in series aiding fashion, the junction between thyristors of each thyristor pair being coupled to a respective phase of said three phase AC source, said thyristor pairs being coupled in parallel and adapted for coupling to said filter means, said thyristors being sequentially rendered conductive in a predetermined order to supply charge current to said batter at predetermined intervals.

3. The invention according to claim 2 wherein said filter means comprises an inductor coupled between said first full bridge controlled rectifier circuit and said battery.

4. The invention according to claim 2 wherein said second full bridge controlled rectifier circuit is configured of a three phase full bridge bridge controlled rectifier network and comprises:

(a) a second three pairs of thyristors, the thyristors in each of said second three pairs being coupled in series aiding fashion, the junction between thyristors of each of said second three pairs being coupled to a corresponding phase of said three phase AC source, said second three pairs of thyristors being coupled in parallel and adapted for coupling to said filter means, said thyristors being sequentially rendered conductive in a predetermind order for conducting battery discharge current to said three phase AC source at other than said predetermind intervals.

5. The invention according to claim 4 including gating means for supply gating signals to each thyristor of said first three pairs of thyristors and said second three pairs of thyristors for rendering the thyristors of said first three pairs of thyristors conductive during said predetermined intervals and for rendering the thyristors of said second three pairs of thyristors conductive during other than said predetermined intervals.

6. The invention according to claim 2 wherein said second full bridge controlled rectifier circuit is configured of a full wave bridge rectifier network and comprises:

(a) a fourth thyristor pair comprised of a first and second thyristor coupled in series aiding fashion and adapted for coupling at the junction between thyristors to the positive terminal of a battery under charge;
(b) a fifth thyristor pair comprised of a third and fourth thyristor coupled in series aiding fashion and adapted for coupling at the junction between thyristors to the negative terminal of a battery under charge, said fourth and fifth thyristor pairs being coupled through said filter means to said first full bridge controlled rectifier circuit; and
(c) first and second thyristor commutating circuits coupled across said second and third thyristors, respectively,
(d) said first and fourth thyristors being rendered conductive at said predetermined intervals to conduct charge current to said battery from said first controlled rectifier circuit and said second and third thyristors being rendered conductive at other than said predetermined intervals to discharge said battery by conducting battery discharge current to said AC source.

7. The invention according to claim 6 including gating means for supplying gating signals to each thyristor of said first three pairs of thyristors and said fourth and said fifth pairs of thyristors for rendering the thyristors of said first three pairs of thyristors and the first and third thyristors of said fourth and fifth thyristor pairs conductive during said predetermined intervals and for rendering the thyristors of said three pairs of thyristors and the second and fourth thyristors of said third and fourth thyristor pairs conductive during other than said predetermined intervals.

8. An efficient battery charger for rapidly charging batteries by increasing the rate of battery charge acceptance through periodic battery discharge in a substantially lossless manner at a high rate for short intervals during the charging process comprising:

(a) an AC source;
(b) a battery to be charged;
(c) a first phase controlled full bridge rectifier network coupled to said AC source for supplying DC charge current to said battery at predetermined intervals;
(d) a second phase controlled full bridge rectifier network coupled in parallel with said first phase controlled full bridge rectifier network for discharging said battery at other than said predetermined-intervals by providing a low loss discharge path to conduct said battery discharge current through said AC source; and
(e) inductor means for coupling said battery to said first and second phase controlled full bridge rectifier networks.

9. An efficient battery charger for rapidly charging batteries by increasing the rate of battery charge acceptance through periodic battery discharge in a substantially lossless manner at a high rate for short intervals during the charging process comprising:

(a) an AC source;
(b) a battery under charge;
(c) a phase controlled rectifier network coupled to said AC source for supplying DC charge current to said battery during predetermined intervals and for conducting battery discharge current to said AC source during other than said predetermined intervals;
(d) a controlled rectifier network for conducting charge current from said first phase controlled rectifier network to said battery during said predetermined intervals and for discharging said battery by conducting battery discharge current to said first phase controlled rectifier network for conduction through said AC source during other than said predetermined intervals; and
(e) inductor means for coupling said first and second phase controlled rectifier networks.

* * * * *